United States Patent [19]

Berdou

[11] Patent Number: 4,653,151
[45] Date of Patent: Mar. 31, 1987

[54] MACHINE FOR SKINNING DIFFERENT PRODUCTS AND IN PARTICULAR FISH

[76] Inventor: Louis J. Berdou, 11, rue des Villegranges, 93260 Les Lilas, France

[21] Appl. No.: 803,251

[22] Filed: Dec. 2, 1985

[30] Foreign Application Priority Data

Dec. 5, 1984 [FR] France ................. 84 18559

[51] Int. Cl.⁴ ............................. A22C 25/17
[52] U.S. Cl. ........................... 17/62; 17/21; 99/589
[58] Field of Search ............ 17/21, 26, 62, 64; 99/589, 588

[56] References Cited

U.S. PATENT DOCUMENTS

| 2,534,166 | 12/1950 | Gierke et al. | 17/26 |
| 2,912,027 | 11/1959 | Townsend. | |
| 3,716,893 | 2/1973 | Vogelsang | 17/26 |
| 4,451,953 | 6/1984 | Leining | 17/21 |
| 4,466,344 | 8/1984 | Schill | 17/21 X |

FOREIGN PATENT DOCUMENTS

| 0018275 | 10/1980 | European Pat. Off. . |
| 1345554 | 3/1964 | France . |
| 2441339 | 6/1980 | France . |
| 2475855 | 8/1981 | France . |
| 2481636 | 11/1981 | France . |
| 2520588 | 8/1983 | France . |

Primary Examiner—Willie G. Abercrombie
Attorney, Agent, or Firm—Karen M. Gerken; Marty P. Hoffman

[57] ABSTRACT

The machine comprises, inside a frame, a tray, a driving cylinder, a stripping plate, and a comb. According to the invention, the frame supports a geared motor unit permanently coupled to a driving pinion which is accessible at least by its upper front part for engagement with a driven pinion secured to the cylinder and which is mounted idle on one of the two side-plates rigidly braced to constitute the frame, each side-plate defining, on the one hand, a groove with a blind end for mounting the comb and, on the other hand, a U-shaped housing, open at the top and on the side, to receive a bearing provided on an end trunnion of the cylinder, the stripping plate having, opposite the housings of the two side-plates, two projecting stop pins which, when instant fastening means secure said plate to the frame, ensure positioning of the plate, locking of the cylinder bearings, meshing of the driven pinion with the driving pinion and engagement of the teeth of the comb in the grooves of the cylinder.

6 Claims, 5 Drawing Figures

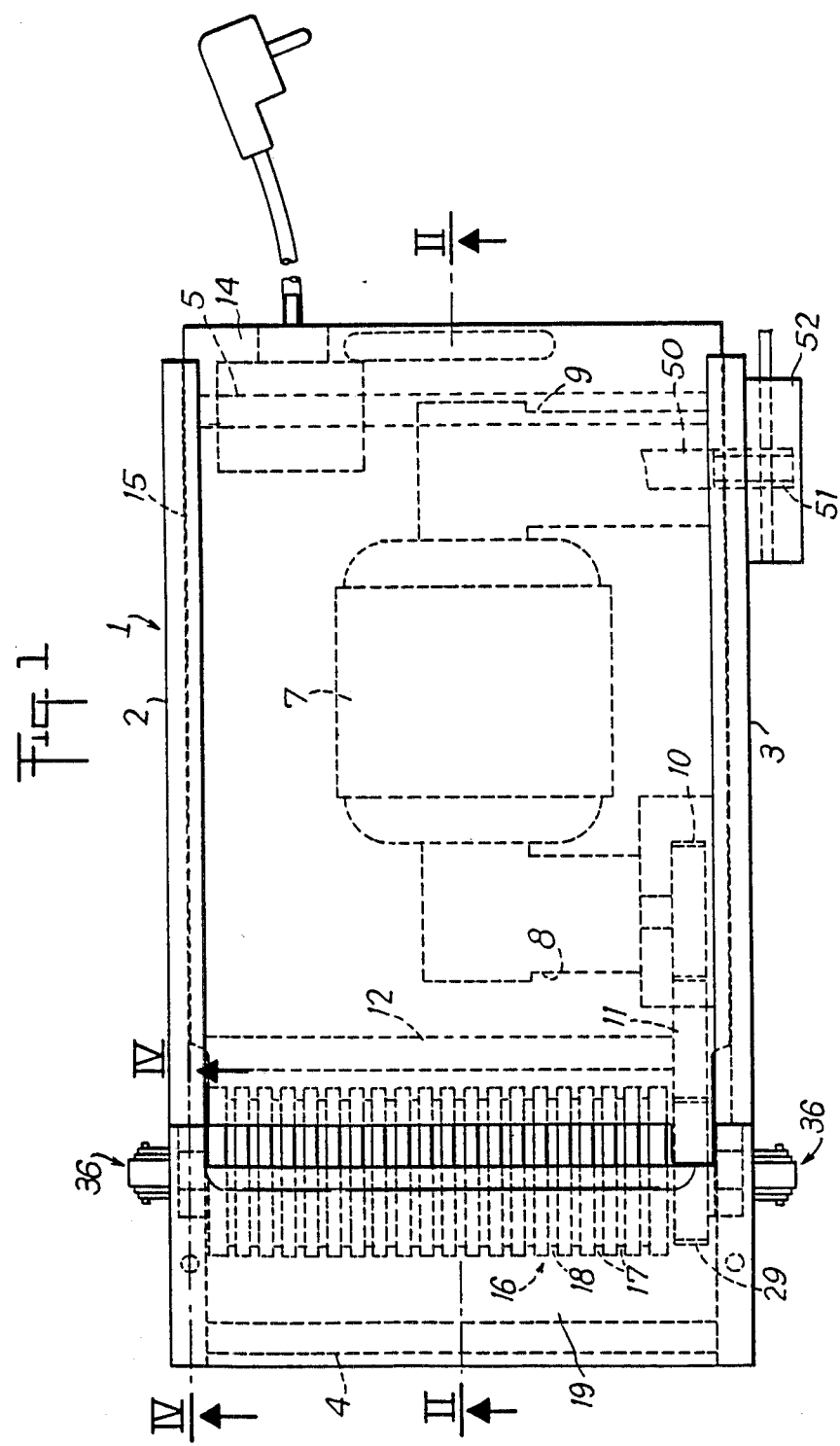

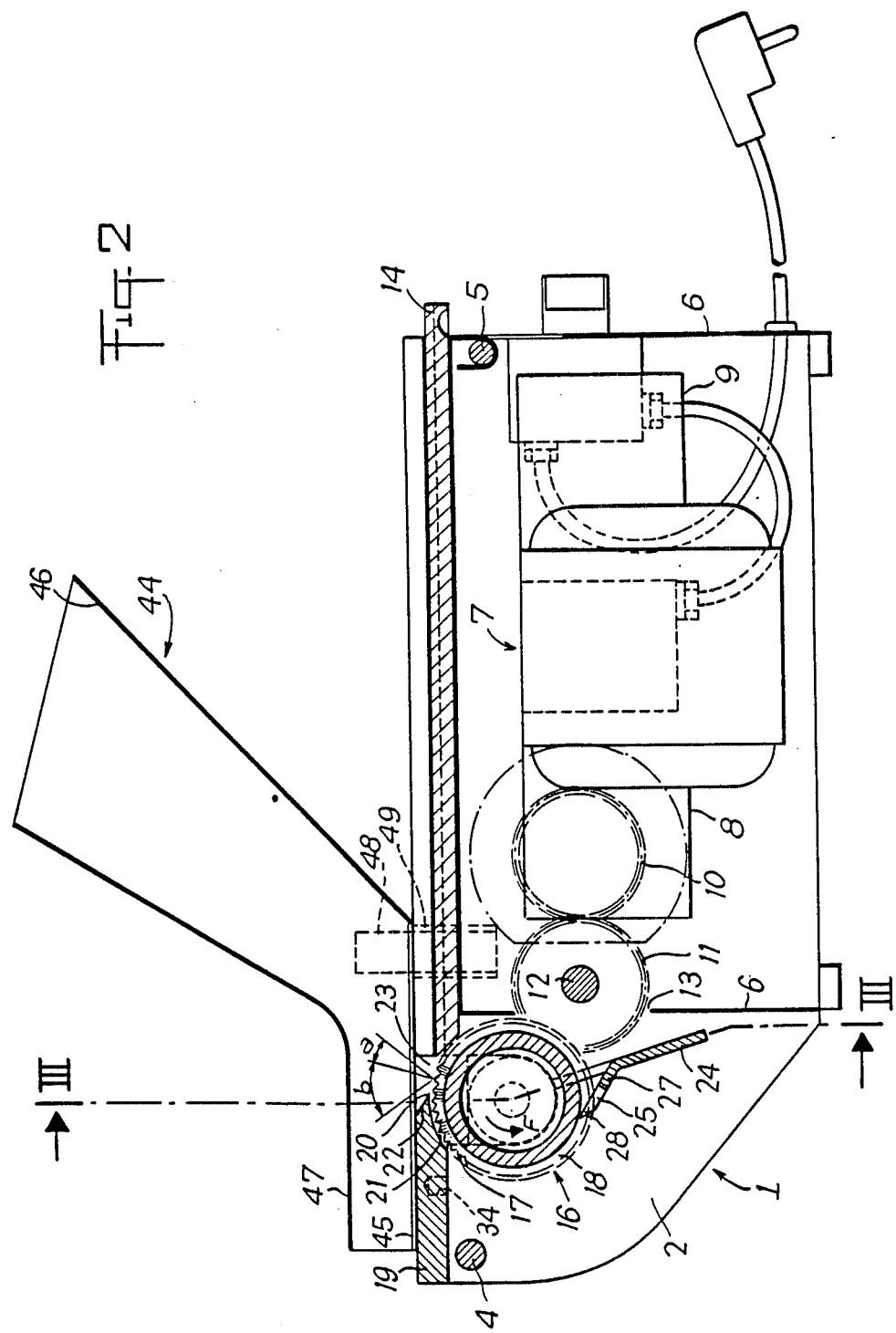

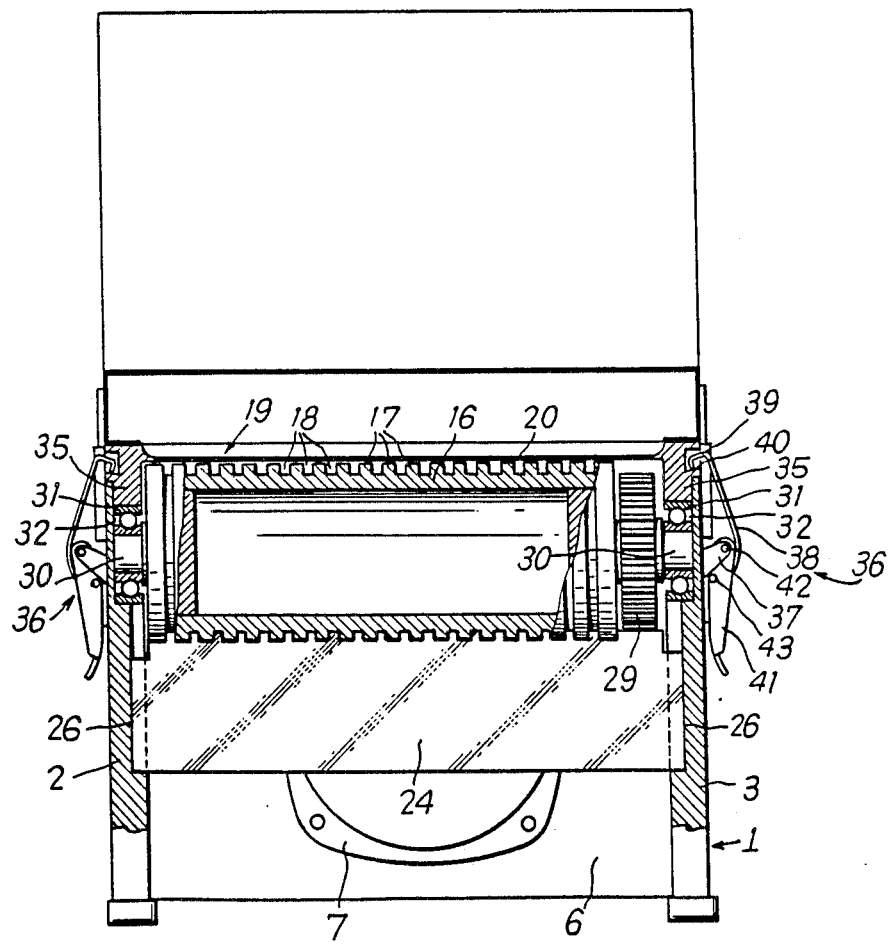

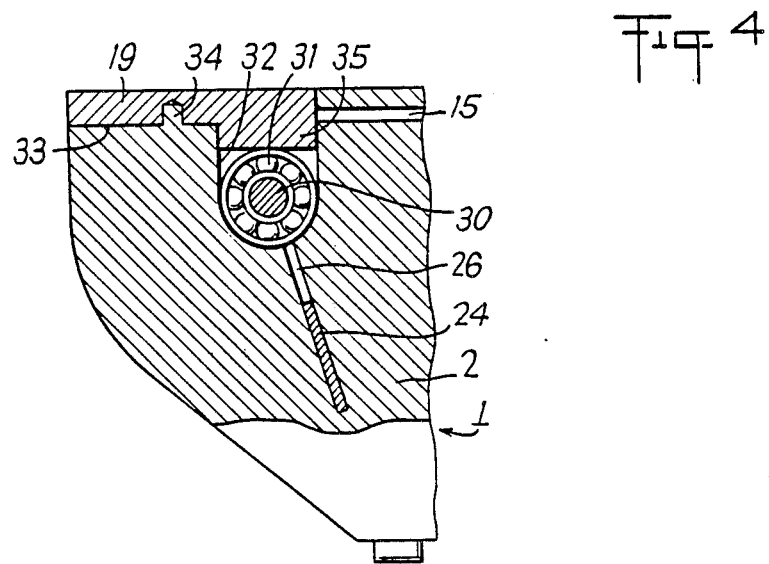
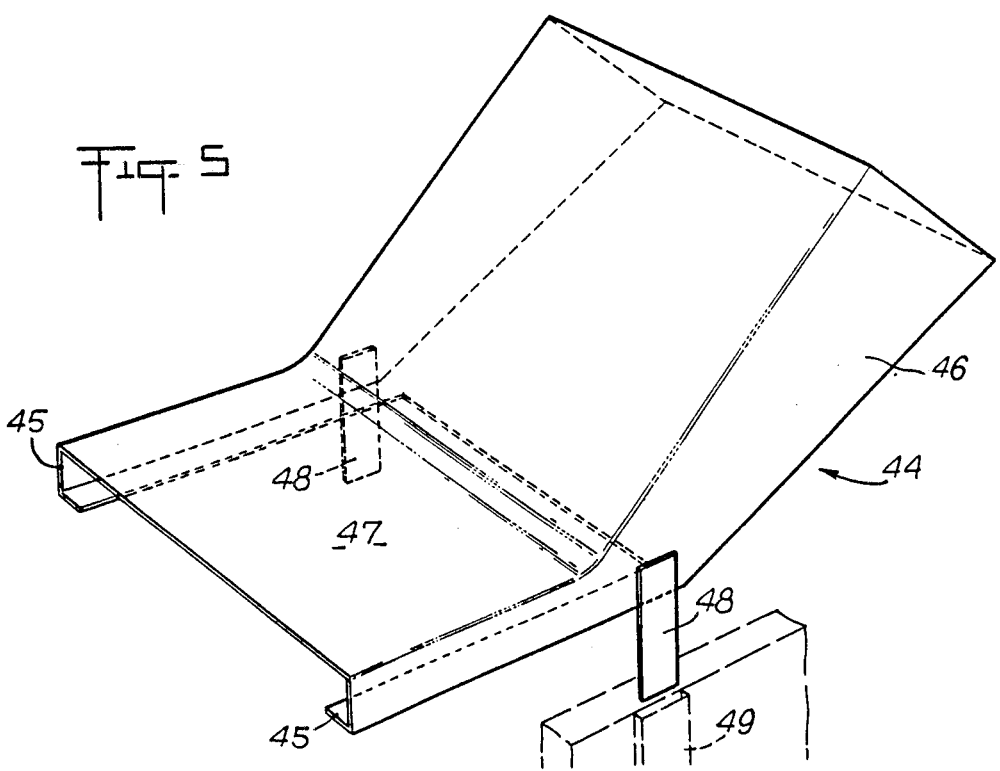

MACHINE FOR SKINNING DIFFERENT PRODUCTS AND IN PARTICULAR FISH

The present invention relates to a machine for skinning various types of products, and in particular fish.

Machines of this type are already known and described in particular in French Patent Nos. 1 358 888, 2 275 150, 2 380 737, 2 419 026, 2 451 253, 2 475 855, 2 481 636, 2 483 186. These machines comprise, inside a frame, a presentation tray for the product, a driving cylinder, of which the rear half is situated beneath the tray to which it is tangential, a stripping plate of which the end, forming knife, is defined by a lower incurved part adaptable over the top of the front part of the cylinder, and by a sloping upper part, as well as a comb of which the teeth penetrate into grooves provided between serrated portions of the cylinder, said cylinder being connected to means for driving it in rotation.

In actual fact, these machines are much more complex, and heretofore, no one has succeeded with this equipment alone, to skin for example fish, without damaging the fillets. Also with these complex machines, the cylinder can clog up so that interruptions are frequent and cleanings necessary.

Moreover, these machines are heavy and cumbersome, hence difficult to use on market stalls or in travelling points of sale, such as selling vans.

Said machines are also long and difficult to clean, because of the presence of inaccessible nooks and recesses, even with a spray of water on brushes, so that in the next utilization the goods risk to be soiled and thus to go bad rapidly. Besides this very important hygienic problem, there is also a problem of smell: the installation, being situated close to the products on display, must not release bad smells.

It is the object of the present invention to overcome the aforesaid drawbacks by designing a simplified machine and making it more compact, lighter, easy and quick to clean thoroughly, with guaranteed safety and reliability of operation, while reducing skinning time, keeping up quality standards and observing the rules of security by protecting the hands.

To this effect, it is important that all elements getting soiled can be readily removed without using tools, in order that the normally inaccessible parts of these elements and of the frame can be cleaned with jets of water, or soaked or brushed. Machines, of which certain elements are dismountable, are already known, for example from French Patent Nos. 2,441,339 and 2 454 357. But these machines cannot really be cleaned in all the ideal conditions of smell and hygiene.

The object of the invention is therefore that indicated hereinabove coupled with the advantages of the already known machines, but with, in addition, a new design which is solid, reliable and economical, easy to dismount and to clean, and meeting the aforesaid ideal conditions of hygiene and smell.

According to the invention, the frame supports a geared motor unit permanently coupled to a driving pinion which is accessible at least by its upper front part for engagement with a driven pinion secured to the cylinder and which is mounted idle on one of the two side-plates rigidly braced to constitute the frame, each side-plate defining, on the one hand, a groove with a blind end for mounting the comb and, on the other hand, a U-shaped housing, open at the top and on the side, to receive a bearing provided on an end trunnion of the cylinder, the stripping plate having, opposite the housings of the two side-plates, two projecting stop pins which, when instant fastening means secure said plate to the frame, ensure positioning of the plate, locking of the cylinder bearings, meshing of the driven pinion with the driving pinion and engagement of the teeth of the comb in the grooves of the cylinder.

Play between the driving cylinder and the incurved lower part of the stripping plate is reduced to a minimum and is only a few hundreths of a millimeter, the instant fastening means comprising an elastically deformable member so that said play can vary slightly and thus compensate for variations in the thickness of the skin.

Preferably, the instant fastening means are constituted by toggle locks situated close to the ends of the driving cylinder, each one comprising a lug mounted on the corresponding side-plate of the frame, a hook-shaped fastener designed to cooperate with a catch of the stripping plate, and a control lever articulated in manner known per se, on the lug and on the fastener in order to snap into locked position by abutting against the side-plate in going beyond the null position, the fastener being an arched flat spring.

The machine further comprises a chute, fitting removably on the frame, for cleaning purposes, said chute reaching over the slot, between stripping plate and tray, through which the cylinder appears and said chute covering said slot over to make it inaccessible to anyone's hands.

The invention will be more readily understood on reading the following description with reference to the accompanying drawings in which:

FIG. 1 is a plan view of the machine according to the invention with the chute removed.

FIG. 2 is an elevational crosssection taken along line II—II of FIG. 1.

FIG. 3 is a stippled cross-section taken along line III—III of FIG. 2.

FIG. 4 is a partial cross-section taken along line IV—IV of FIG. 1.

FIG. 5 is a perspective view of the chute.

As illustrated in FIGS. 1 to 4, the machine according to the invention comprises a frame 1 constituted by two side-plates 2, 3 rigidly joined together by way of front 4 and back 5 tie-pieces, as well as by a box 6 open at the bottom.

In said box 6 is mounted an insulated geared motor unit 7 presenting two outputs 8 and 9 the axes of which are perpendicular to the axis of the driving shaft, and transmitting the rotation at two different speeds.

Output 8 turns a pinion 10 at low speed, said pinion being in permanent engagement with a driving pinion 11 wedged on a transverse shaft 12 supported by bearings of the side-plates 2, 3. Said driving pinion 11 traverses a window 13 of the box 6 so that its upper front part is accessible for engagement of a removably driven pinion 29, described hereinafter.

The machine proper, is composed, in its operational part, of:
- a tray 14 for presenting the fish or other product, which tray is removable by a sliding movement and guided in grooves 15 of side-plates 2, 3;
- a cylinder 16 for moving the fish forward, which cylinder is provided with teeth 17 extending longitudinally and having top angles of about 90°; said teeth are dissymmetrical and leaning downstream, when considering the direction F of rotation of said cylinder, in that in relation to the polar radius of one tooth, the angle "a" of its working flank is smaller than angle "b" of its rear clearance flank; in addition, grooves 18 are provided at regular intervals in the cylinder 16 and serve to remove the skin stripped off the fillets; said cylinder is substantially tangential to the tray 14 and is situated beneath as well as in front of the box 6;

a stripping plate 19 which extends at the front of the cylinder 16 whereas the tray 14 is placed at the back; its rear end 20 forming knife is defined by a lower part 21, which is incurved correspondingly to cylinder 16, and by a sloping upper part 22, so that said knife behaves more like a wedge than like a sharp edge; said plate 19 is separated from the tray 14 by a slot 23 giving access to the driving cylinder 16;

a comb 24 situated under the cylinder 16 and extending into frame 1 in substantially radial direction; said comb ends with teeth 25 which penetrate into the grooves 18 of the cylinder.

As clearly illustrated in FIGS. 1 to 4:

the comb 24 is removable and, to this effect, its lateral edges are guided in translation into blind grooves 26 of side-plates 2, 3, which grooves are oriented radially with respect to cylinder 16; in the illustrated example, the upper border 27 of the comb into which the teeth 25 are cut, is arched upstream, with respect to the direction of rotation F; said arched and toothed border 27 extends beyond the guiding grooves 26 and ends with a bevelled edge 28 which touches the bottom of the grooves 18 of the cylinder to scrape off any wastes resulting from the stripping operation, the driving cylinder 16 is removable and, to this effect, it is monobloc with a driven pinion 29 which, when assembled, engages with the driving pinion 11, and it is extended by co-axial end trunnions 30 equipped with bearings 31 designed to engage by their top part into housings 32 of side-plates 2 and 3; said housings are U-shaped and issue both on the top of the frame and inside it.

the stripping plate 19 is removable and, to this effect, it rests on supporting surfaces 33 of the side-plates, it is positioned by means of centering studs 34 and presents projecting stop pins 35 to penetrate into housings 32 for tightening the outer cages of roller bearings 31 thus holding the roll 16 in position, ensuring engagement of driven pinion 29 with driving pinion 11 and slightly wedging the comb 24 by contact of its lower border with the bottom of guiding grooves 26 and of the bevelled edge 28 of its teeth 25 with the bottom of the grooves 18 of the cylinder.

The incurved part 21 of the knife 20 of stripping plate 19 and the driving cylinder 16 are very close together, the clearance between them being only a few hundreths of a millimeter. It is stabilized at this value, owing to the means used for securing the stripping plate to the frame, and it is elastically returned to said value, by these very means, after the stripping of a thicker skin.

In the example illustrated in FIG. 3, these means are toggle locks 36 which join the plate 19 to the side-plates 3 at the front, but close to trunnions 30 of the cylinder 16. Each lock comprises a lug 37 mounted on the corresponding side-plate and a fastener 38 of which the end hook 39 cooperates with a catch 40 of the stripping plate; it further comprises a control lever 41 mounted for pivoting on a pin 42 of the lug 37 and on a pin 43 of the fastener, locking being achieved when the lever abuts and when its pin 43 goes beyond the null position 40, 42. Said lock ensures an instant but firm and resilient fastening, due to the fact that the pull-member 38 is a flat spring, which has been arched and calibrated to this effect.

The machine further comprises a chute 44 covering the slot 23 so as to make it inaccessible to hands, but sloping towards it in order to bring the fish to be skinned to the cylinder 16 and to the knife 20. Chute 44 comprises two U-sections 45 designed to rest on side-plates 2, 3 and monobloc, on the one hand, with an upwardly diverging funnel 46 of rectangular cross-section, and, on the other hand, with a cover plate 47. Fish is introduced into the funnel 46 and moves by gravity towards the slot 23; said fish is skinned by the cylinder 16 cooperating with the knife 20; the skin is first picked up under the incurved part 21 of the stripping plate by the toothed and grooved cylinder, then detached and rejected by the comb 24; the fillets go through the sloping part 22 of the knife and advance under the cover plate 47 onto stripping plate 19.

The chute 44 is removable and, to this effect, it is provided with two side strips 48 downwardly directed and designed to fit into slits 49 of the frame.

To be cleaned, the machine must first be taken to pieces, which is readily done: the chute 44 is disengaged; the tray 14 is removed; the locks 36 are released; the stripping plate 19 is raised; the cylinder 16 is disengaged by bringing the roller bearings 31 out of the housings 32; the comb 24 is extracted by sliding. All these elements are washed, brushed and disinfected and the same applies to the remaining skeleton frame. After what, the whole assembly is put together again by proceeding in reverse.

It is finally important to note that this machine can also be used for preparing the fish. Indeed, the output 9 of the geared motor unit 7 turns a shaft 50 at higher speed than the pinion 10 of output 8 and said shaft 50 is equipped with movement pick-up means such as a six-pan fitting 51 and an instant locking mechanism 52, for a cable driving a rotary scraper or a cable controlling scissors or other like means.

What is claimed is:

1. A machine for skinning various products such as fish comprising:

a frame, said frame including a pair of side plates;

a tray supported by said frame, said tray being adapted to present the product to be skinned;

a geared motor unit supported by said frame;

a driving pinion permanently coupled to said geared motor unit;

a driven pinion, said driven pinion being adapted to engage at least the upper front portion of said driving pinion, said driving pinion being mounted idle on one of said side plates;

a driving cylinder having end trunnions, said cylinder being connected for rotation to said driven pinion, said driving cylinder being provided with serrated portions separated by grooves, the lower portion of said driving cylinder being situated beneath said tray, said driving cylinder being substantially tangential to said tray;

a stripping plate, the rear end of said stripping plate forming a knife, said knife being defined by a lower inwardly curved edge and by an upper sloping edge, said lower edge being disposed over the upper front portion of said driving cylinder;

a blind groove defined in each of said side plates;

a comb mounted in said blind grooves, said comb being provided with teeth, said teeth penetrating into said grooves provided on said driving cylinder;

a U-shaped housing defined in each of said side plates; said housings being open at the top and on the side;

a cylinder bearing provided on each of the end trunnions of said driving cylinder, siad bearings being received within said U-shaped housings;

fastening means for securing said stripping plate to said frame, and at least one projecting stop pin provided on each side of said stripping plate opposite said U-shaped housings, said stop pins being adapted to insure positioning of said stripping plate, locking of said cylinder bearings, meshing of said driving and driven pinions, and engagement of said teeth of said comb in said grooves of said driving cylinder.

2. A machine for skinning as recited in claim 1 wherein play between said driving cylinder and said lower inwardly curved edge of said knife is approximately a few hundreths of a millimeter, and said fastening means comprises an elastically deformable member such that said play can vary slightly and thereby compensate for variations in the thickness of the skin of the product to be skinned.

3. A machine for skinning as recited in claim 2 wherein said fastening means includes a toggle lock situated close to each end of said driving cylinder, each of said toggle locks comprising a lug mounted on the corresponding side plate of said frame, a hook-shaped fastener, said fastener being an arched flat spring having an end hook, a catch provided on said stripping plate, said end hook being adapted to cooperate with said catch, and a control lever, said control lever being adapted to pivot on said lug and on said fastener whereby said control lever is snapped into locked position by abutting against said corresponding side plate in going beyond a null position.

4. A machine for skinning as recited in claim 1 further comprising a chute, said chute fitting removably on the frame for cleaning purposes, said chute extending over the slot formed between said stripping plate and said tray through which said driving cylinder appears, said chute being adapted to cover said slot so as to make said slot inaccessible to a person's hands.

5. A machine for skinning as recited in claim 1 wherein said teeth of said comb are arched upstream when considering the direction of rotation of said driving cylinder, said direction corresponding to the feeding direction of the skins.

6. A machine for skinning as recited in claim 1 wherein said geared motor unit comprises a second output turning at a higher speed and being equipped with movement pick-up means adapted to receive a cable.

* * * * *